(12) United States Patent
Cho et al.

(10) Patent No.: US 9,916,044 B2
(45) Date of Patent: Mar. 13, 2018

(54) DEVICE AND METHOD FOR INFORMATION PROCESSING USING VIRTUAL KEYBOARD

(71) Applicant: KOREA UNIVERSITY RESEARCH AND BUSINESS FOUNDATION, SEJONG CAMPUS, Sejong-si (KR)

(72) Inventors: Hyeonjoong Cho, Gyeonggi-do (KR); Dae-Woong Choi, Gyeonggi-do (KR)

(73) Assignee: KOREA UNIVERSITY RESEARCH AND BUSINESS FOUNDATION, SEJONG CAMPUS, Sejong-si (KR)

( * ) Notice: Subject to any disclaimer, the term of this patent is extended or adjusted under 35 U.S.C. 154(b) by 116 days.

(21) Appl. No.: 14/958,496

(22) Filed: Dec. 3, 2015

(65) Prior Publication Data

US 2016/0085379 A1 Mar. 24, 2016

Related U.S. Application Data

(63) Continuation of application No. PCT/KR2014/004912, filed on Jun. 3, 2014.

(30) Foreign Application Priority Data

Jun. 5, 2013 (KR) .................. 10-2013-0064443

(51) Int. Cl.
| | |
|---|---|
| *G06F 3/042* | (2006.01) |
| *G06F 3/01* | (2006.01) |
| *G06K 9/00* | (2006.01) |
| *G06K 9/20* | (2006.01) |
| *G06K 9/46* | (2006.01) |

(Continued)

(52) U.S. Cl.
CPC ............ *G06F 3/0426* (2013.01); *G06F 3/011* (2013.01); *G06K 9/00375* (2013.01); *G06K 9/209* (2013.01); *G06K 9/46* (2013.01); *G06K 9/6202* (2013.01); *G06K 9/72* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 8,300,023 B2 * | 10/2012 | Forutanpour | G06F 3/0216 178/18.01 |
| 2002/0021287 A1 * | 2/2002 | Tomasi | G06F 1/1613 345/168 |

FOREIGN PATENT DOCUMENTS

| | | |
|---|---|---|
| JP | 2012-108857 A | 6/2012 |
| JP | 2012-252584 A | 12/2012 |
| KR | 10-2002-0079847 A | 10/2002 |

(Continued)

OTHER PUBLICATIONS

International Search Report for PCT/KR2014/004912 dated Aug. 28, 2014.

*Primary Examiner* — Kenneth B Lee, Jr.
(74) *Attorney, Agent, or Firm* — Typha IP LLC

(57) ABSTRACT

An information processing device is provided. The device comprises a 3D sensor configured to acquire depth information of a user's hand image and depth information of a background image on an object plane; a storage device in which a character input application is stored; a processor configured to execute the character input application; and a display configured to display a virtual keyboard by executing the character input application.

20 Claims, 9 Drawing Sheets

(51) Int. Cl.
    *G06K 9/62*     (2006.01)
    *G06K 9/72*     (2006.01)

(56) References Cited

FOREIGN PATENT DOCUMENTS

| KR | 10-2008-0103327 A | 11/2008 |
| KR | 10-2009-0060888 A | 6/2009 |
| KR | 10-2013-0020418 A | 2/2013 |

\* cited by examiner

*FIG. 4*
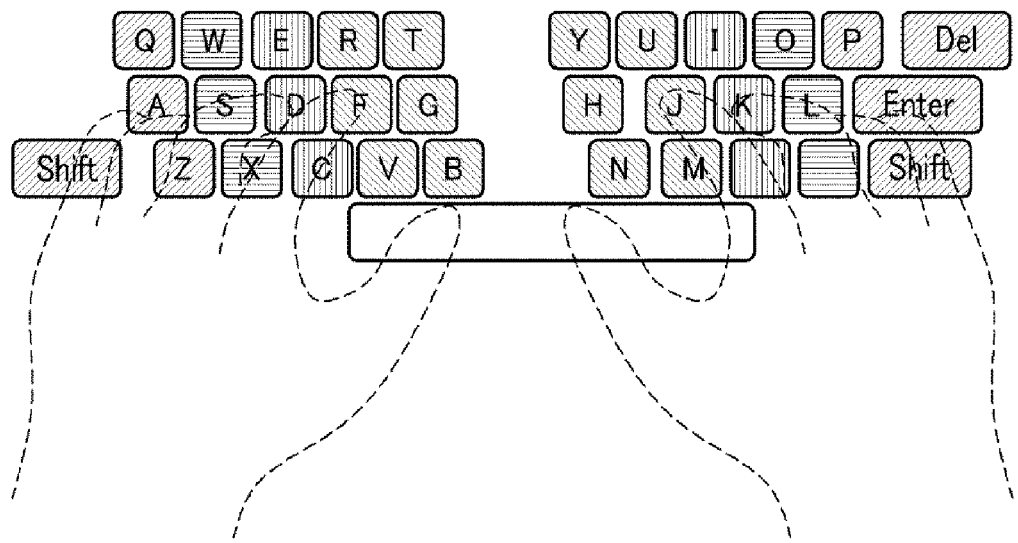
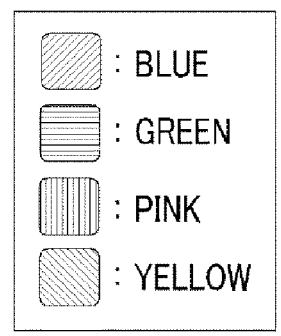
*FIG. 5A*
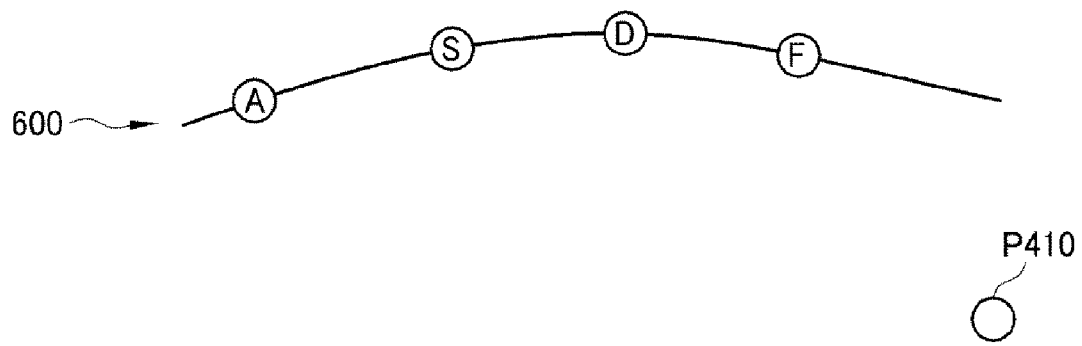

FIG. 6

| FINGER | INPUTTABLE CHARACTER | COLOR |
|---|---|---|
| L5 (LEFT LITTLE FINGER) | Q, A, Z, lShift | BLUE |
| L4 (LEFT RING FINGER) | W, S, X | GREEN |
| L3 (LEFT MIDDLE FINGER) | E, D, C | PINK |
| L2 (LEFT FOREFINGER) | R, F, V, T, G, B | YELLOW |
| L1 (LEFT THUMB) | space | GRAY |
| R1 | space | GRAY |
| R2 | Y, H, N, U, J, M | YELLOW |
| R3 | I, K, ? | PINK |
| R4 | O, L, SPECIAL SYMBOL | GREEN |
| R5 | P, Enter, rShift, Delete | BLUE |

DEVICE AND METHOD FOR INFORMATION PROCESSING USING VIRTUAL KEYBOARD

CROSS-REFERENCE TO RELATED APPLICATION

This Application is a continuation application of PCT Application No. PCT/KR2014/004912 filed on Jun. 3, 2014, which claims the benefit of Korean Patent Application No. 10-2013-0064443 filed on Jun. 5, 2013, the entire disclosures of which are incorporated herein by reference.

TECHNICAL FIELD

The embodiments described herein pertain generally to a device and method for information processing using a virtual keyboard.

BACKGROUND

As the mobile environment has been rapidly generalized and advanced, mobile devices which can be used regardless of place or time have been actively developed. In particular, mobile devices having various and simple shapes have been developed in order to increase mobility. By way of example, a touch screen-based mobile device such as a smart phone and a table PC is not equipped with a separate physical keyboard, but may output a virtual keyboard on a screen. Such a mobile device is easy to carry, and can reduce errors caused by unskilled usage by providing a QWERTY keyboard similar to a physical keyboard.

However, a touch screen-based virtual keyboard may have various sizes depending not on a size of a user's hand but on a size of a touch screen. Thus, the touch screen-based virtual keyboard may not be enough for all of ten fingers to be used or is highly likely to cause the user to make typing errors depending on the size of the user's hand. Meanwhile, a mobile device or electronic device which is not based on a touch screen may be integrated with a physical keyboard or may include a separate keyboard. However, the integrated physical keyboard includes small-sized keys and thus is highly likely to cause the user to make typing errors. Further, the separate keyboard is inconvenient to carry and may be limited in space.

Meanwhile, in this regard, Korean Patent Laid-open Publication No. 2002-0079847 (entitled "Method and apparatus for entering data using virtual input device") suggests a virtual input device configured to: provide a sensor capable of capturing three-dimensional positional information of a relative position of at least one user digit with respect to a work surface upon which the user may input data with the user digit; process information captured by the sensor to determine whether the user digit contacted a portion of the work surface and, if contacted, to determine a position of the contact; and output, to the companion system, digital information identical in size with the contact position.

DISCLOSURE OF THE INVENTION

Problems to be Solved by the Invention

In view of the foregoing problems, example embodiments provide an information processing device and method capable of detecting a finger-tip point with a 3D sensor, recognizing a key corresponding to a finger-tip point that performs an input process, and inputting a character matched thereto.

Means for Solving the Problems

An information processing device is provided herein. The information processing device may include a 3D sensor configured to acquire depth information of a user's hand image and depth information of a background image on an object plane; a storage device in which a character input application is installed; a processor configured to execute the character input application; and a display configured to display a virtual keyboard by executing the character input application, wherein the storage device may store an information table in which at least one inputtable key is matched to each finger and different keys are matched to respective fingers to set an input key candidate depending on performing of an input process by the user, the processor may extract positional information of a finger-tip point and feature points of a hand on the basis of the depth information of the user's hand image and the depth information of the background image acquired by the 3D sensor when the character input application is executed, the processor may extract adjacency between the finger-tip point that performs the input process and a key on the virtual keyboard, and calculate a context score on the basis of the positional information of the finger that performs the input process, positional information that does not perform the input process, and positional information of the feature points, the processor may determine the input key on the basis of the adjacency and the context score, and the processor may read a character matched to the input key from the information table and displays the character.

A character input method using an information processing device is provided herein. The character input method may include acquiring depth information of a user's hand image and depth information of a background image on an object plane by a 3D sensor; extracting positional information of a finger-tip point and feature points of a hand on the basis of the depth information of the user's hand image and the depth information of the background image acquired by the 3D sensor; generating a virtual keyboard matched to each finger when more than a predetermined finger-tip points simultaneously come into contact with the object plane; determining an input key on the basis of adjacency between a position of the finger-tip point that performs an input process and a key on the virtual keyboard and a context score; and reading a character matched to the input key from an information table and displaying the character, wherein the context score may be calculated on the basis of the positional information of the finger that performs the input process, positional information that does not perform the input process, and positional information of the feature points, and in the information table, at least one inputtable key may be matched to each finger and different keys are matched to respective fingers to set an input key candidate depending on performing of an input process by the user.

Effect of the Invention

According to the above-described technical means for solving the problem, the virtual keyboard is easy to carry, and, thus, it can be used regardless of place or time. Further, it is possible to generate a user-customized virtual keyboard based on a size, characteristics and habits of a user's hand, and, thus, it is possible to offer convenience to the user.

BRIEF DESCRIPTION OF THE DRAWINGS

FIG. 4 is a diagram provided to describe a position of a finger-tip point on a QWERTY keyboard in accordance with an exemplary embodiment of the present disclosure;

FIGS. 5A-5C is a diagram provided to describe generation of a virtual keyboard in accordance with an exemplary embodiment of the present disclosure;

FIG. 6 is a diagram illustrating inputtable characters and colors of keys matched to fingers in accordance with an exemplary embodiment of the present disclosure;

MODE FOR CARRYING OUT THE INVENTION

Figure 1:
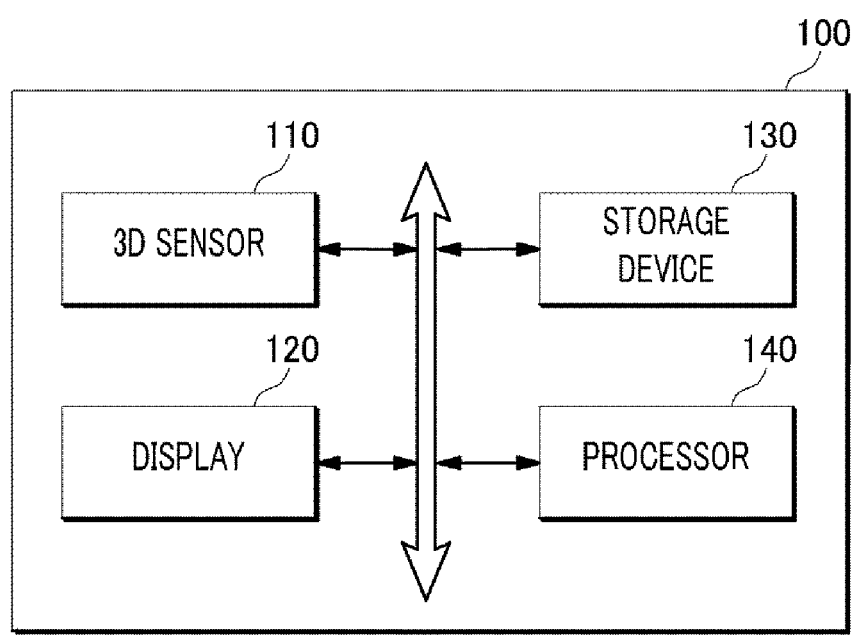
FIG. 1 is a block diagram provided to describe a configuration of an information processing device in accordance with an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a block diagram provided to describe a configuration of an information processing device in accordance with an exemplary embodiment of the present disclosure.

Herein, in an exemplary embodiment of the present disclosure, there will be described an example where an information processing device 100 is a multi-media device (for example, a smart TV).

For reference, although FIG. 1 illustrates the components of the information processing device 100 based on finger recognition in accordance with an exemplary embodiment, other processing units (not illustrated) may be further included therein depending on the kind of a device.

Further, the information processing device 100 in accordance with an exemplary embodiment of the present disclosure may not be limited to the multi-media device, but may include various kinds of devices. Each device may further include other different processing units depending on the kind and the purpose of the device.

The information processing device 100 in accordance with an exemplary embodiment of the present disclosure includes a 3D sensor 110, a display 120, a storage device 130, and a processor 140.

The 3D sensor 110 acquires depth information of a user's hand image and depth information of a background image on an object plane. That is, the 3D sensor 110 can detect the three-dimensional depths of the user's hand image and the background image. The depth information acquired by the 3D sensor 110 may be used to detect a position of a finger-tip point. Details thereof will be described later with reference to the processor 140 and FIG. 3.

The display 120 displays a virtual keyboard thereon by executing a character input application. The virtual keyboard visually displays an inputtable key for each finger, and can show a key input by performing an input process by the user. The user can visually check the input process through the virtual keyboard displayed on the display 120. Further, the display 120 may display a character matched to the key depending on the input of the virtual keyboard.

The storage device 130 stores an information table in which the character input application is installed and which matches at least one inputtable key to each finger and also matches different keys to the respective fingers to set an input key candidate depending on performing of an input process by the user. Herein, the information table may include characters matched to the keys, and the characters may include an alphabet, Korean characters, Chinese characters, hiragana, numerals, or punctuation marks which can be input by tapping the keyboard.

The processor 140 executes the character input application. When the character input application is executed, the processor 140 extracts positional information of the finger-tip point on the basis of the depth information of the user's hand image and the depth information of the background image acquired by the 3D sensor 110, determines an input key on the basis of adjacency between the positional information of the finger-tip point that performs the input process and the key on the virtual keyboard, and reads a character matched to the input key from the information table and displays the character. That is, the processor 140 may generate a virtual keyboard, determine an input key by extracting positional information of a finger-tip point that performs an input process, and read a character matched to the input key.

The processor 140 may extract positional information of a finger-tip point and determine a finger that performs an input process by the following procedure.

Figure 3:
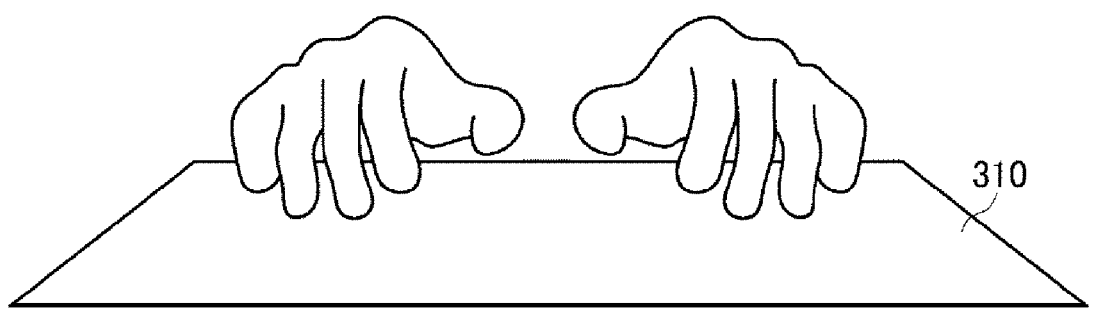
FIG. 3 is a diagram illustrating an example of obtaining an image of a user's hand with a 3D sensor located in front of the user's hand.

Firstly, positional information of a finger-tip point may be extracted as follows. Details thereof will be described with reference to FIG. 3. FIG. 3 is a diagram illustrating an example of obtaining an image of a user's hand with a 3D sensor located in front of the user's hand.

The processor 140 may generate a background image by using the 3D sensor 110 and then deduct depth information of the background image from depth information of a user's hand image generated when a user's hand enters a sensing area of the 3D sensor 110. Thus, the processor 140 may extract only the user's hand image. The user's hand image extracted by this procedure is as illustrated in FIG. 3. In this case, the background image may be acquired when the user's hand is not present in the sensing area of the 3D sensor 110, or if the user's hand is present in the sensing area of the 3D sensor 110, the background image may be inferred on the assumption that an object plane 310 is under the image. Then, positions $\{\vec{L}_5, \vec{L}_4, \vec{L}_3, \vec{L}_2, \vec{L}_1, \vec{R}_1, \vec{R}_2, \vec{R}_3, \vec{R}_4, \vec{R}_5\}$ of tip points of the ten fingers can be acquired from the extracted user's hand image by locating ten discontinuous points in a near distance from a position of the 3D sensor 110. For reference, L denotes the left hand, R denotes the right hand, 1 denotes the thumb, 2 denotes the forefinger, 3 denotes the middle finger, 4 denotes the ring finger, and 5 denotes the little finger.

Further, the processor 140 may acquire several feature points $\{\vec{A}_1, \vec{A}_2, \ldots\}$ from the user's hand by using the 3D sensor 110. For example, the highest point (e.g., a starting point of the forefinger) in the user's hand may be a feature point. For another example, feature points may be acquired by using a geometric hand model. The acquired feature points may be used as additional information for inferring a shape, a movement and a position of the hands or fingers. For example, in order to detect a position of a finger-tip point, a position of the 3D sensor 110 or a feature point may be defined as a starting point.

If the depth information of the finger-tip point is continuous with depth information of the object plane 310, the processor 140 may determine that the finger-tip point comes into contact with the object plane and also determine that the finger-tip point in contact with the object plane performs an input process. That is, if there is no great change in depth information ranging from the finger-tip point to the object plane, the process 140 may determine that an input process is performed.

Then, the processor 140 may generate a virtual keyboard by the following procedure.

If more than a predetermined number of finger-tip points simultaneously come into contact with the object plane 310, the processor 140 may generate a virtual keyboard matched to each finger. For example, if the number of contacts is set to 5 for the left hand and to 5 for the right hand, when the tip points of the ten fingers simultaneously come into contact with the object plane 310, the virtual keyboard may be generated.

Further, when the processor 140 generates the virtual keyboard in which key arrangement is adaptively set on the basis of positions of the respective fingers, a reference key line connecting the tip points of the respective fingers may be set and keys may be arranged on an upper side or a lower side of the reference key line.

For example, when the processor 140 generates five keys matched to five fingers and a reference key line connecting the keys and generates keys having the same interval and an auxiliary key line having the same curvature as the reference key line on an upper side or lower side of the reference key line separate from the reference key line by an average distance between the keys, the processor 140 may generate reference key lines and auxiliary key lines for the respective left and right hands and generate a virtual keyboard for setting characters respectively matched to the keys. Further, the processor 140 may further generate keys separate by the average distance between the keys in addition to the five keys generated on the reference key line or the auxiliary key line and match characters to the keys, and, thus, generate a virtual keyboard. That is, the processor 140 may generate a QWERTY keyboard including keys arranged on the basis of a distance between the user's fingers (i.e., a distance between the keys) within an accessible range of the user's fingers.

Further, the processor 140 may evaluate the validity of positional information between the key lines, a distance between the keys, and a curvature of the reference key line, and then generate a virtual keyboard. That is, the processor 140 may evaluate the validity in order to determine whether the keys generated after the generation of the QWERTY keyboard for both hands are arranged at appropriate positions with an appropriate interval.

The virtual keyboard generated as such may be generated differently for each user depending on a size of the hand and a distance between the fingers. Therefore, it is a user's own virtual keyboard, and, thus, it is easy to use and reduces an error occurrence probability. More details of the virtual keyboard will be described later with reference to FIG. 4 to FIG. 7.

Further, the processor 140 checks a word error in the characters displayed depending on performing of the input process by the user and then automatically corrects the error or recommends an expected word. In this case, the processor 140 may recommend an expected word having a high likelihood on the basis of inputtable characters for the finger. In the virtual keyboard of the present disclosure, there is a limit to inputtable keys (i.e., characters) for each finger. Therefore, the expected word can be recommended from a narrow range in number of expected words. Thus, it is possible to increase accuracy of a word which the user wants to input.

Further, the processor 140 may display the virtual keyboard and virtual fingers linked to a movement of the user's fingers on the display 120. That is, the processor 140 visually displays the virtual keyboard through graphic design and overlappingly displays the virtual fingers linked to the user's hand. Thus, the user can visually identify a movement of the user's hand or an operation status of an input process. Furthermore, the processor 140 may display inputtable keys for the respective fingers in different colors. In this case, the processor 140 may display at least one key assigned to each finger in the same color. Since the inputtable keys for each finger are displayed in the same color, the user can easily identify a configuration of the virtual keyboard and select a desired key. Further, the processor 140 may display an input key in a noticeable color. That is, since the user can identify an input key displayed in a noticeable color in real time, the user can give feedback on which key or finger performs an input process. More details thereof will be described later with reference to FIG. 7.

Then, the processor 140 may determine an input key by the following procedure.

The processor 140 may determine adjacency depending on a position score calculated on the basis of information of a contact position where a finger-tip point that performs an input process comes into contact with the object plane 310 and positional information of inputtable keys assigned to the finger. Further, the processor 140 may further calculate a context score on the basis of positional information of a finger that does not perform an input process and positional information of feature points and determine adjacency depending on a score calculated on the basis of the position score and the context score. A key with the highest score among the calculated scores may be determined as an input key.

For example, if a left little finger $\{\vec{L}_5\}$ performs an input process and keys "Q", "A", "Z", and "lShift (left Shift)" are inputtable keys assigned to the left little finger $\{\vec{L_5}\}$, a score may be calculated as follows.

Positions of the respective fingers are represented as FNG=$\{\vec{L_5},\vec{L_4},\vec{L_3},\vec{L_2},\vec{L_1},\vec{R_1},\vec{R_2},\vec{R_3},\vec{R_4},\vec{R_5}\}$, positions of keys in the generated virtual keyboard are represented as KEY=$\{\vec{A}, \vec{B},\vec{C},\ldots,\vec{rShift},\vec{Enter}\}$ position of feature points in the hand are represented as ANK=$\{\vec{A_1}, \vec{A_2}, \ldots\}$, and a position of a finger-tip point that performs an input process is in the left little finger $\{\vec{L_5}\}$. Therefore, a score of the key "Q" may be calculated by $S(Q)=C_{Q1}\times PS_Q(\vec{L_5},\vec{Q})+C_{Q2}\times CS_Q(FNG,ANK,KEY)$, a score of the key "A" may be calculated by $S(A)=C_{A1}\times PS_A(\vec{L_5},\vec{A})+C_{A2}\times CS_A(FNG,ANK,KEY)$, a score of the key "Z" may be calculated by $S(Z)=C_{Z1}\times PS_Z(\vec{L_5},\vec{Z})+C_{Z2}\times CS_Z(FNG,ANK,KEY)$, and a score of the key "lShift" may be calculated by $S(lS)=C_{lS1}\times PS_{lS}(\vec{L_5},\vec{lS})+C_{lS2}\times CS_{lS}(FNG,ANK,KEY)$.

Herein, PS( ) denotes a position score. The position score is calculated as the reciprocal of a distance difference between information of a contact position of the finger-tip point on the object plane 310 and positional information of inputtable keys for the finger on the virtual keyboard. For example, $PS_Q(\vec{L_5},\vec{Q})$ can be calculated by the following Equation 1.

$$PS_Q(\vec{L_5},,\vec{Q}) = \begin{cases} 0, & \text{when } |\vec{L_5}-\vec{Q}| > D_a \\ MaxScore, & \text{when } |\vec{L_5}-\vec{Q}| < \frac{1}{MaxScore} \\ \frac{1}{|\vec{L_5}-\vec{Q}|}, & \text{otherwise} \end{cases} \quad [\text{Equation 1}]$$

Equation 1 may be designed differently for each key in the virtual keyboard for more precise control. For example, as for keys "Q, W, E, R, T, Y, U, I, O, P" positioned on an upper side of the QWERTY keyboard, even if the user touches an upper side of a predetermined position of the key on the virtual keyboard when viewed from the user, Equation 1 may be designed not to decrease a PS( ) value. Such a design makes it possible to reduce errors when the user performs an input process of the keys positioned on the upper side.

Further, CS( ) denotes a context score, and the weight thereof can be adjusted by $C_x$. The context score may help infer an input key on the basis of positional information a finger that does not perform an input process and positional information of feature points. Herein, a degree of contribution of the PS( ) and CS( ) functions to the whole evaluation function can be adjusted by the weight $C_x$. If it is determined that context information is also important as much as a touch on an exact position, the weights of the PS( ) and CS( ) functions may be set to the same value. For example, if a left middle finger $\{\vec{L_3}\}$ comes into contact with a key corresponding to a position of a key "E" in order to input the key "E", a left ring finger $\{\vec{L_4}\}$ also moves toward a key "W" on the virtual keyboard. By using this characteristic, when the left middle finger $\{\vec{L_5}\}$ performs an input process of the key "E", if a line connecting the left ring finger $\{\vec{L_4}\}$ and the left middle finger $\{\vec{L_3}\}$ upwardly moves in parallel to a key line, Equation 1 may be designed to increase a $CS_E( )$ value depending on an anatomical structure of the hand. Thus, even if the left middle finger $\{\vec{L_3}\}$ comes into contact with a space between the key "E" and a key "D", a context score $CS_E( )$ of the key "E" is higher than a context score of the key "D". Therefore, the key "E" may be determined as an input key. For another example, when a left forefinger $\{\vec{L_2}\}$ performs an input process in order to input a key "G", a left thumb $\{\vec{L_1}\}$ also moves to the right. By using this characteristic, if a line connecting the left forefinger $\{\vec{L_2}\}$ and the left thumb $\{\vec{L_1}\}$ upwardly moves to the right in parallel to a key line, Equation 1 may be designed to increase a $CS_G( )$ value. This makes it possible to distinguish a key "F" and the key "G" and further increase the input probability of the key "G".

Accordingly, the processor 140 may compare scores S(Q), S(A),S(Z),S(lS) of the respective keys and determine a key with the highest score as an input key.

Figure 2A:
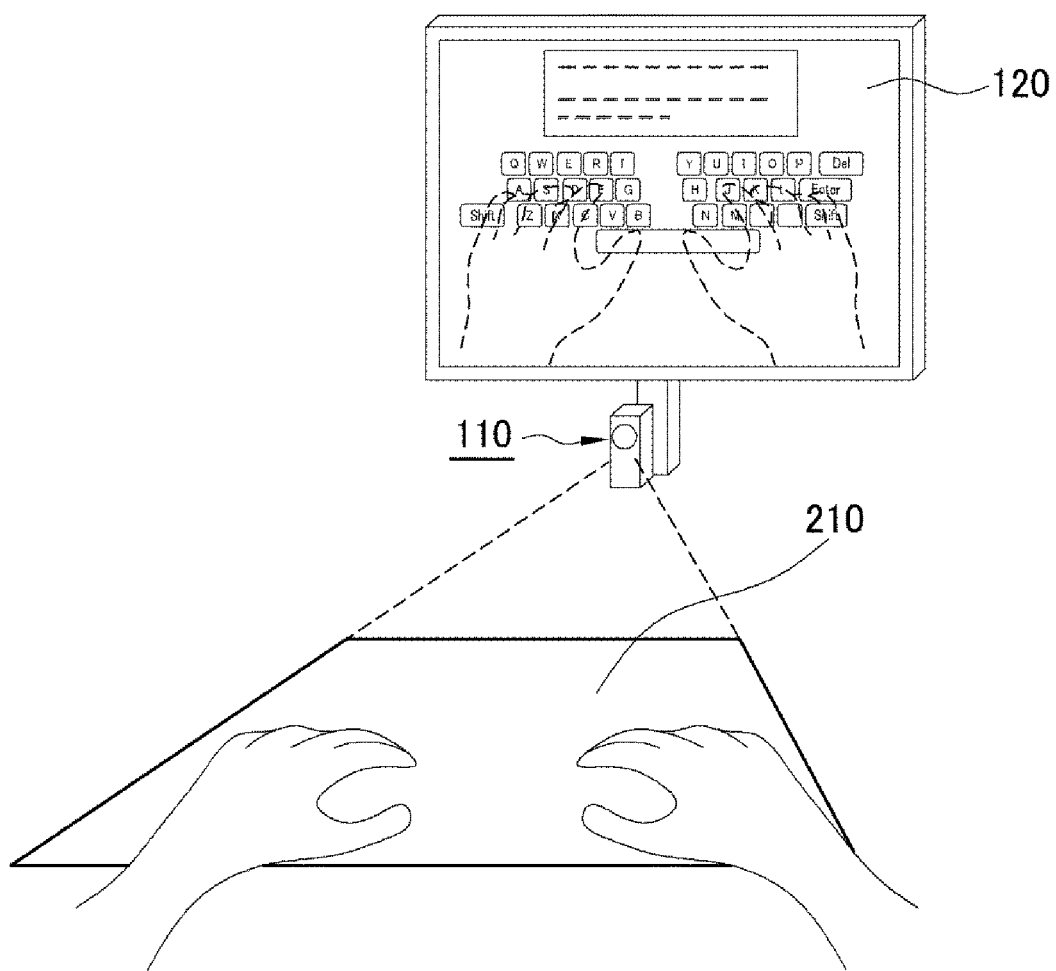
FIGS. 2A and 2B is a diagram provided to describe the use of an information processing device in accordance with an exemplary embodiment of the present disclosure.
Figure 2B:
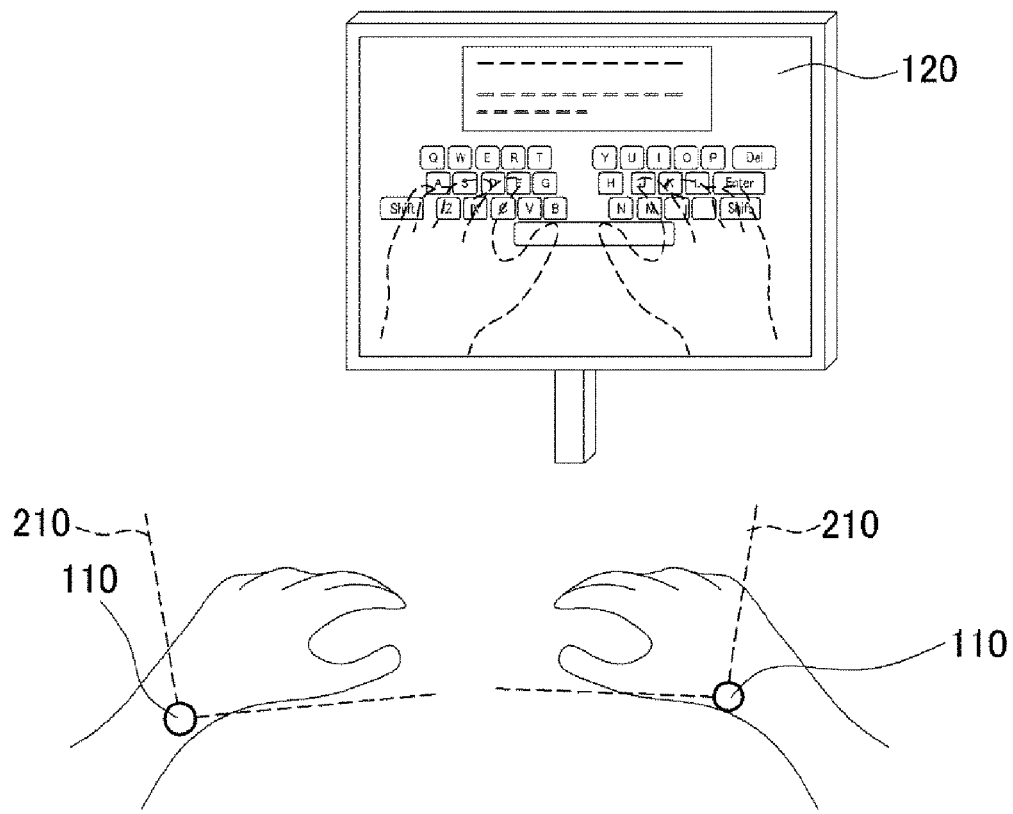

FIGS. 2A and 2B is a diagram provided to describe the use of an information processing device in accordance with an exemplary embodiment of the present disclosure.

The information processing device 100 may be installed on any plane and used without a physical keyboard. As illustrated in FIG. 2A, the information processing device 100 may include the display 120 and the 3D sensor 110. Herein, the 3D sensor 110 may be provided or installed in the information processing device 100, or the separate 3D sensor 110 may be additionally provided or installed. The 3D sensor 110 may be positioned in front of the hands of the user looking at the display 120 and generate a sensing area 210. Herein, the 3D sensor 110 may extract an image of the user's hands in the sensing area 210 and a background image.

Further, as illustrated in FIG. 2B, the information processing device 100 may include the display 120 and one or more 3D sensors 110. In this case, the 3D sensors 110 may be installed under the user's wrists. Herein, the 3D sensors 110 may be formed into a wrist watch or a wrist support. In such a configuration, the sensing area 210 is divided around one hand. Thus, the both hands are not limited to position and distance.

FIG. 4 is a diagram provided to describe a position of a finger-tip point on a QWERTY keyboard in accordance with an exemplary embodiment of the present disclosure.

An exemplary embodiment of the present disclosure will be described as an example where a virtual keyboard can be generated when all fingers of the left hand and the right hand perform an input process.

A virtual keyboard may be generated on the basis of key arrangement of a conventional QWERTY keyboard. Firstly, if the ten fingers simultaneously perform an input process, the information processing device 100 may start generating the virtual keyboard. In this case, when positions of tip points of the respective fingers are represented as $\{\vec{L_5}, \vec{L_4}, \vec{L_3}, \vec{L_2}, \vec{L_1}, \vec{R_1}, \vec{R_2}, \vec{R_3}, \vec{R_4}, \vec{R_5}\}$, they may correspond to positions of keys A", "S", "D", "F", "Space", "Space", "J", "K", "L", "Enter" on the QWERTY keyboard as illustrated in FIG. 4. Further, keys may be generated by determining positions of the other keys of the QWERTY keyboard on an upper side and a lower side on the basis of such a correspondence. A process for determining the positions of the other keys will be described with reference to FIGS. 5A-5C.

Figure 5B:
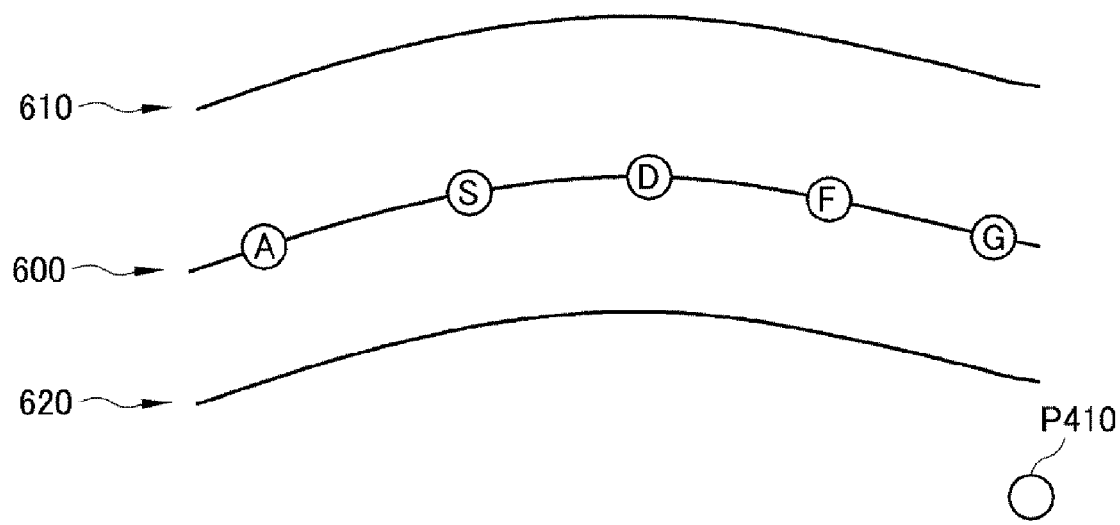
Figure 5C:
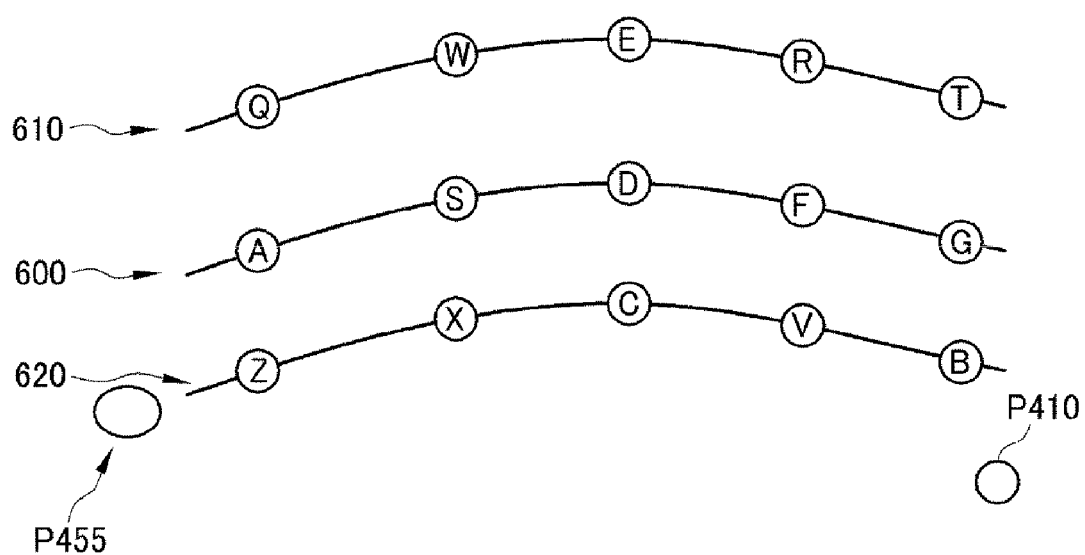

FIGS. 5A-5C is a diagram provided to describe generation of a virtual keyboard in accordance with an exemplary embodiment of the present disclosure.

Herein, FIGS. 5A-5C is a diagram provided to describe generation of a virtual keyboard for the left hand. A virtual keyboard for the right hand can also be generated by the same process.

Five circles illustrated in FIG. 5A respectively indicate positions of finger-tip points. That is, the positions of the finger-tip points are generated at the positions where the five fingers perform an input process, and these positions are positions of keys. With respect to a left little finger, a left ring finger, a left middle finger, and a left forefinger $\{\vec{L_5}, \vec{L_4}, \vec{L_3}, \vec{L_2}\}$, keys "A", "S", "D", and "F" may be generated, and a reference key line 600 connecting these keys may be generated. With respect to a left thumb $\{\vec{L_1}\}$, a key "Space" P410 may be generated. In this case, an average distance $D_a$ between "A" and "S", between "S" and "D", and between "D" and "F" may be calculated, and then used for key arrangement.

Then, as illustrated in FIG. 5B, auxiliary key lines 610 and 620 may be generated on an upper side and a lower side of the reference key line 600. In this case, a key "G" may be additionally generated at a position separate from the position of the left forefinger-tip point $\{\vec{L_2}\}$ by the average distance $D_a$. That is, with respect to the left forefinger $\{\vec{L_2}\}$, two keys "F" and "G" may be generated on the reference key line 600.

Then, as illustrated in FIG. 5C, keys of the QWERTY keyboard assigned to each finger may be generated on the generated auxiliary lines 610 and 620 with the same interval as the keys positioned on the reference key line 600. That is, on the auxiliary key line 610 positioned on the upper side, keys "Q", "W", and "E" may be generated with respect to the left little finger, the left ring finger, and the left middle finger $\{\vec{L_5}, \vec{L_4}, \vec{L_3}\}$, respectively, and keys "R" and "T" may be generated with respect to the left forefinger $\{\vec{L_2}\}$. The keys "Q", "W", "E", "R", and "T" positioned on the upper side may have a slight offset in the left and right directions within a scope of the auxiliary key line 610 for convenience of the user. Further, on the auxiliary key line 620 positioned on the lower side, keys "Z", "X", and "C" may be generated with respect to the left little finger, the left ring finger, and the left middle finger $\{\vec{L_5}, \vec{L_4}, \vec{L_3}\}$, respectively, and keys "V" and "B" may be generated with respect to the left forefinger $\{\vec{L_2}\}$. In this case, a key "lShift" P455 may be additionally generated at a position separate from the position of the left little finger-tip point $\{\vec{L_5}\}$ by the average distance $D_a$ and continuous with the auxiliary key line 620 with the same curvature.

Meanwhile, after the virtual keyboard is generated as described above, a validity evaluation may be conducted. For example, if a distance between a key "Space" as a position of a tip point of a thumb and a key "B" close to the key "Space" is smaller than 80% of the average distance $D_a$, the virtual keyboard may be determined as being invalid. For another example, there may be a case where a distance between a key "T" generated for the left hand and a key "Y" generated for the right hand is smaller than the average distance $D_a$, or there may be a case where the curvature of the reference key line 600 and the auxiliary key lines 610 and 620 is out of a predetermined range (in which it is determined that a curvature is too high and thus causes inconvenience in use). If there is any case where the virtual keyboard is determined as being unsuitable for use, a message asking the user to regenerate a virtual keyboard may be displayed on the display 120.

After the validity evaluation, if the virtual keyboard is determined as being valid for use, the virtual keyboard is generated. If all the fingers are taken off the object plane 310, the virtual keyboard may be switched to a state available for character input. The generated virtual keyboard may be stored and managed in the storage device 130.

In the virtual keyboard illustrated in FIGS. 5A-5C, inputtable keys are assigned to each finger. Details thereof will be described with reference to FIG. 6.

FIG. 6 is a diagram illustrating inputtable characters and colors of keys matched to fingers in accordance with an exemplary embodiment of the present disclosure.

As illustrated in FIG. 6, inputtable characters are assigned to each finger. Thus, each finger may be allowed to input predetermined characters only. For example, a left middle finger may be allowed to input only one of keys "E", "D" or "C", and a left little finger may be allowed to input only one of keys "Q", "A", "Z" or "lshift". Accordingly, when each finger performs an input process, even if the finger deviates slightly from a scope of the keys assigned to the finger, since the inputtable characters are set for the finger, it is possible to infer the inputtable characters with more accuracy. For example, when the left little finger $\{\vec{L_5}\}$ performs an input process, even if the left little finger $\{\vec{L_5}\}$ crosses a position of the left ring finger $\{\vec{L_4}\}$, it is possible to detect the left little finger as a finger that performs the input process. Thus, it may be determined that one of the keys "Q", "A", "Z" or "lShift" assigned to the left little finger $\{\vec{L_5}\}$ is input. Thus, it is possible to suppress a typing error when a key is input. Meanwhile, the characters assigned to each finger as illustrated in FIG. 6 are provided for illustration, and may be changed depending on the user's settings.

Further, in the virtual keyboard, different colors may be assigned to the respective fingers, and keys matched to a finger may be displayed in a color assigned thereto. For example, if keys "E", "D", "C", "I", "K", and "?" assigned to the middle fingers are displayed in pink, the user may visually identify the keys displayed in pink on the virtual keyboard as inputtable keys for the left and right middle fingers. Further, since the different colors are assigned to the respective fingers, a color displayed on the virtual keyboard makes it easy to visually identify keys assigned to each finger. Details thereof will be described with reference to FIG. 7.

Figure 7:
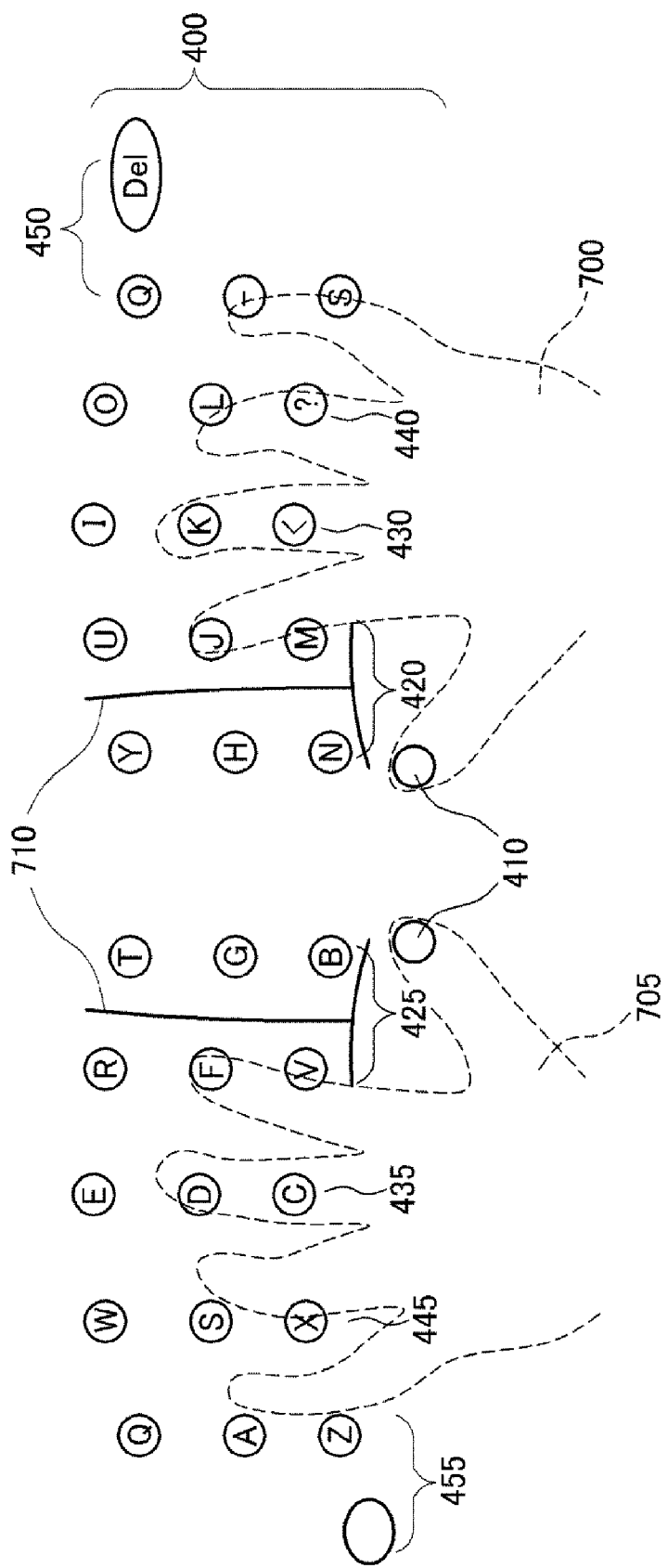
FIG. 7 is a diagram illustrating a virtual keyboard in accordance with an exemplary embodiment of the present disclosure.

FIG. 7 is a diagram illustrating a virtual keyboard in accordance with an exemplary embodiment of the present disclosure.

FIG. 7 shows an example of a virtual keyboard 400 generated by the procedure described with reference to FIGS. 5A-5C and FIG. 6. As illustrated in FIG. 7, a virtual QWERTY keyboard corresponding to the left hand and the right hand may be generated, and the generated virtual keyboard may be displayed on the display 120. In this case, virtual hands 700 and 705 displayed with movement of the hands in real time in synchronization with the user's hands may be overlappingly displayed. Further, an input key to which a finger-tip point of the user performs an input process may be displayed in a noticeable color, and, thus, the user can identify the input key.

Further, a key generated on the virtual keyboard 400 focuses on a center point of the key rather than indicating a boundary of a key on a physical keyboard, and, thus, can show that finger-tip points are matched to keys, respectively. Herein, as described with reference to FIG. 6, the respective keys may have colors as assigned to the respective fingers. For example, a gray key 410 may be assigned to the thumbs, yellow keys 420 and 425 may be assigned to the forefingers, pink keys 430 and 435 may be assigned to the middle fingers, green keys 440 and 445 may be assigned to the ring fingers, and blue keys 450 and 455 may be assigned to the little fingers. Further, as for the forefingers, two keys are arranged on each key line. Therefore, a boundary line 710 for distinguishing the two keys may be additionally displayed. That is, the boundary line 710 may be displayed between keys "R", "F", and "V" and keys "T", "G", and "B" assigned to the left forefinger $\{\vec{L_2}\}$.

Figure 8:
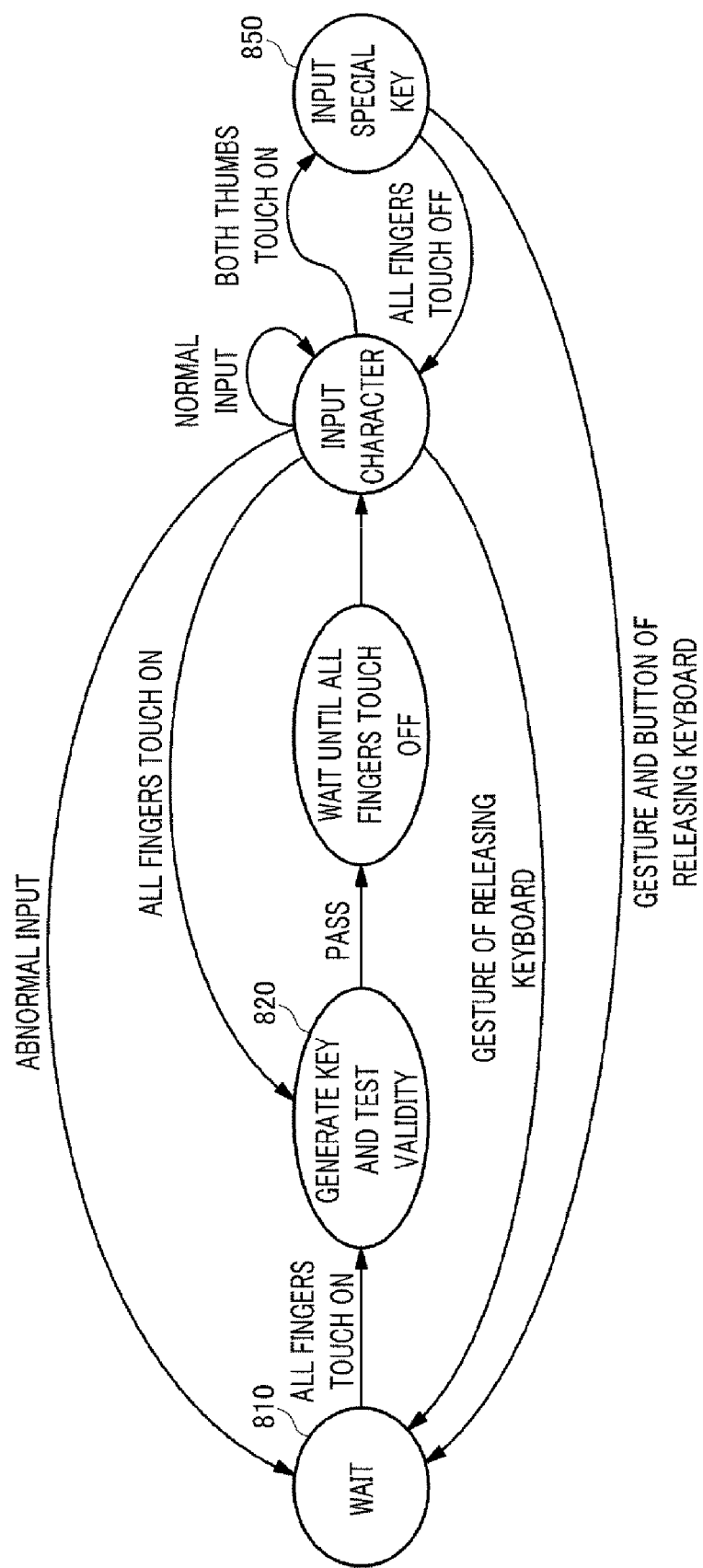
FIG. 8 is a diagram provided to describe generation and input of a virtual keyboard in accordance with an exemplary embodiment of the present disclosure.

FIG. 8 is a diagram provided to describe generation and input of a virtual keyboard in accordance with an exemplary embodiment of the present disclosure.

FIG. 8 shows an example of a state transition diagram when an input process is performed by using the virtual keyboard 400 generated by the procedure described with reference to FIG. 5A to FIG. 7.

Firstly, the user may wait 810 for an input by positioning the fingers in a sensing area.

Then, when all the fingers come into contact with (touch on) the object plane 310, keys may be generated and a validity test 820 may be conducted. That is, the processor 140 may extract positions of all the contacted finger-tip points of the user and generate keys in order to generate the virtual keyboard 400. Further, the processor 140 may determine whether the generated keys are suitable for typing by conducting the validity test.

Then, if the keys pass the validity test, the processor 140 may wait until all the fingers do not come into contact (touch off). When all the fingers do not come into contact, the virtual keyboard 400 may be completely generated.

Finally, an input through the virtual keyboard 400 may be performed as follows. The user may input a character through the generated virtual keyboard 400. In the case of a normal input, characters may be continuously input. In this case, if the both thumbs come into contact with the virtual keyboard 400 to perform a key input process, it is possible to input special keys 850. For example, if the both thumbs come into contact with any special character other than the characters basically arranged on the virtual keyboard 400, an additional key may be generated. The special character may be matched to the additional key, and the both thumbs and the corresponding key may be input. Thus, the special character may be input. However, in the case of an abnormal input or in the case where there is a gesture of releasing the virtual keyboard 400, the virtual keyboard 400 may be switched to a wait 810 state. Further, if the user wants to regenerate keys while inputting characters, all the fingers come into contact with the object plane 310 to generate keys and conduct the validity test 820.

Figure 9:
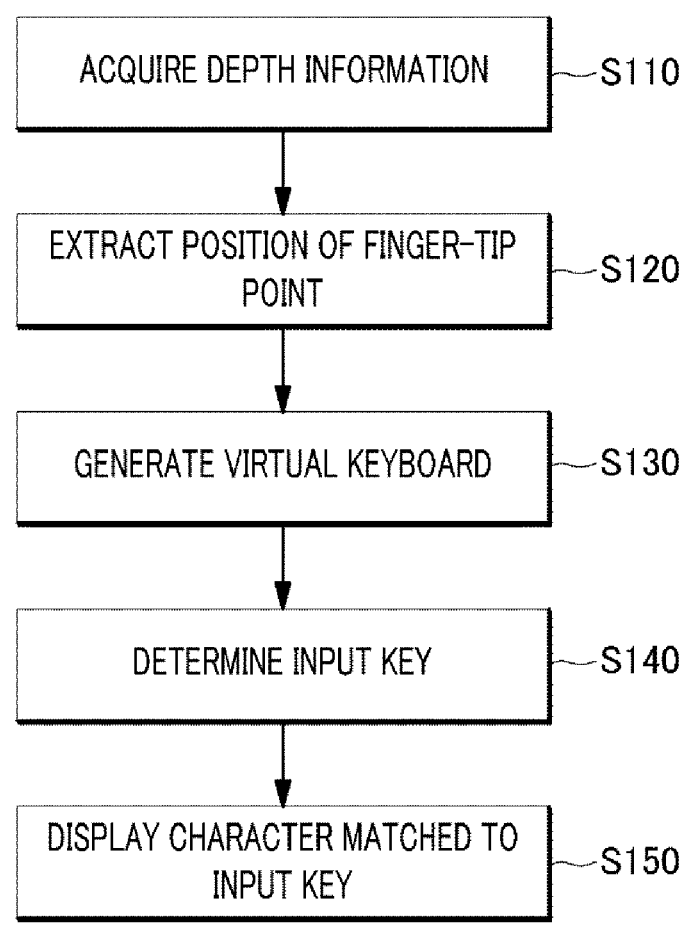
FIG. 9 is a flowchart provided to describe a character input method by using an information processing device in accordance with an exemplary embodiment of the present disclosure.

FIG. 9 is a flowchart provided to describe a character input method by using an information processing device in accordance with an exemplary embodiment of the present disclosure.

In block S110, a 3D sensor acquires depth information of a user's hand image and depth information of a background image on an object plane. That is, the 3D sensor may acquire depth information of the background image including the object plane and then acquire depth information of the user's hand image including depth information of the background image when the user's hand is positioned in a sensing area.

In block S120, positional information of a finger-tip point is extracted on the basis of the depth information of the user's hand image and the depth information of the background image acquired by the 3D sensor. That is, only the depth information of the user's hand image can be extracted by deducting the previously acquired depth information of the background image from the depth information of the user's hand image including the depth information of the background image extracted in block S110. Then, positions of tip points of the ten fingers can be extracted from the extracted user's hand image by locating ten discontinuous points in a near distance from a position of the 3D sensor.

In block S130, if more than a predetermined number of finger-tip points simultaneously come into contact with the object plane, a virtual keyboard matched to each finger may be generated. That is, when the virtual keyboard, in which key arrangement is adaptively set on the basis of positions of the respective fingers, is generated, a reference key line connecting the tip points of the respective fingers may be set and keys may be arranged on an upper side or a lower side of the reference key line.

For example, five keys matched to the five fingers and a reference key line connecting the keys are generated and keys having the same interval and an auxiliary key line having the same curvature as the reference key line are generated on an upper side or lower side of the reference key line separate from the reference key line by an average distance between the keys. In this case, reference key lines and auxiliary key lines for the respective left and right hands may be generated and a virtual keyboard for setting characters respectively matched to the keys may be generated. Further, keys separate by the average distance between the keys may be generated in addition to the five keys generated on the reference key line or the auxiliary key line and matched to characters, and, thus, a virtual keyboard may be generated.

Further, the validity of positional information between the key lines, a distance between the keys, and a curvature of the reference key line may be evaluated, and then a virtual keyboard may be generated.

In block S140, an input key is determined on the basis of adjacency between the position of the finger-tip point that performs the input process and the key on the virtual keyboard.

Firstly, if the depth information of the finger-tip point is continuous with depth information of the object plane, it may be determined that the finger-tip point comes into contact with the object plane and the finger-tip point in contact with the object plane performs the input process. Thus, it is possible to determine adjacency depending on a position score calculated on the basis of information of a contact position where a finger-tip point that performs an input process comes into contact with a plane and positional information of inputtable keys assigned to the finger. Herein, the position score may be calculated as the reciprocal of a distance difference between information of a contact position of the finger-tip point on the plane and positional information of inputtable keys for the finger on the virtual keyboard. A context score may be further calculated on the basis of positional information of a finger that does not perform an input process and positional information of feature points, and adjacency may be determined depending on a score calculated on the basis of the position score and the context score.

Further, a word error in the characters displayed depending on performing of the input process by the user may be checked, and then the error may be automatically corrected or an expected word may be recommended. In this case, an expected word having a high likelihood on the basis of inputtable characters for the finger may be recommended.

In block S150, a character matched to the input key may be read from the information table and displayed. Herein, in the information table, at least one inputtable key is matched to each finger and also, different keys are matched to the respective fingers to set an input key candidate depending on performing of an input process by the user. In this case, the virtual keyboard and virtual fingers linked to a movement of the user's fingers may be displayed on a display. Further, an input key may be displayed in a noticeable color. Furthermore, inputtable keys for the respective fingers may be displayed in different colors on the basis of the information table. In this case, at least one key assigned to each finger may be displayed in the same color.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An information processing device comprising:
   a 3D sensor configured to acquire depth information of a user's hand image and depth information of a background image on an object plane;
   a storage device in which a character input application is stored;
   a processor configured to execute the character input application; and
   a display configured to display a virtual keyboard by executing the character input application,
   wherein the storage device stores an information table in which at least one inputtable key is matched to each finger and different keys are matched to respective fingers to set an input key candidate depending on performing of an input process by the user,
   the processor extracts positional information of a finger-tip point and feature points of a hand on the basis of the depth information of the user's hand image and the depth information of the background image acquired by the 3D sensor when the character input application is executed,
   the processor extracts adjacency between the finger-tip point that performs the input process and a key on the virtual keyboard, and calculates a context score on the basis of the positional information of the finger that performs the input process, positional information that does not perform the input process, and positional information of the feature points,
   the processor determines the input key on the basis of the adjacency and the context score, and
   the processor reads a character matched to the input key from the information table and displays the character.

2. The information processing device of claim 1,
   wherein the processor calculates positional information of a contact point where the finger-tip point that performs the input process comes into contact with the object plane and positional information of inputtable keys assigned to the finger by using a relative position value with respect to the feature points, and determines the adjacency depending on a position score on the basis of the calculated value.

3. The information processing device of claim 2,
   wherein the position score is calculated as the reciprocal of a distance difference between information of the contact position of the finger-tip point on the object plane and positional information of the inputtable keys for the finger on the virtual keyboard.

4. The information processing device of claim 1,
   wherein the processor determines a position of the virtual keyboard on the basis of the extracted positional information of the finger-tip point and feature points of the hand.

5. The information processing device of claim 1,
   wherein the processor generates a virtual keyboard matched to each finger when more than a predetermined number of finger-tip points simultaneously come into contact with the object plane.

6. The information processing device of claim 5,
   wherein the processor generates the virtual keyboard in which key arrangement is set on the basis of positions of the respective fingers, and
   the virtual keyboard is configured such that keys are arranged on an upper side or a lower side of a reference key line connecting tip points of the respective fingers.

7. The information processing device of claim 6,
   wherein the processor generates five keys matched to five fingers and the reference key line connecting the five keys, and generates keys arranged on an upper side or lower side separate from the reference key line by an average distance between the five keys with the same interval as the keys arranged on the reference key line and an auxiliary key line having the same curvature as the reference key line, and
   the processor generates the reference key lines and the auxiliary key lines for a left hand and a right hand, and generates a virtual keyboard for setting characters respectively matched to the keys.

8. The information processing device of claim 7,
   wherein the processor additionally generates a key separate by the average distance between the five keys in addition to the five keys generated on the reference key line or the auxiliary key line and matches the key to a character to generate a virtual keyboard.

9. The information processing device of claim 7,
   wherein the processor evaluates the validity of positional information between key lines, a distance between keys, and a curvature of the reference key line, and then generates a virtual keyboard.

10. The information processing device of claim 1,
    wherein the processor checks a word error in the characters displayed depending on performing of the input process by the user and then automatically corrects the error or recommends an expected word, and the processor recommends an expected word on the basis of inputtable characters for the finger.

11. The information processing device of claim 1, wherein the processor displays the virtual keyboard and virtual fingers linked to a movement of the user's fingers on the display.

12. The information processing device of claim 11, wherein the processor displays inputtable keys for the respective fingers in different colors, and displays at least one key assigned to each finger in the same color.

13. The information processing device of claim 1, wherein the processor displays the input key in a noticeable color.

14. The information processing device of claim 1, wherein when the depth information of the finger-tip point is continuous with depth information of the object plane, the processor determines that the finger-tip point comes into contact with the object plane and also determines that the finger-tip point in contact with the object plane performs an input process.

15. A character input method using an information processing device, comprising:
acquiring depth information of a user's hand image and depth information of a background image on an object plane by a 3D sensor;
extracting positional information of a finger-tip point and feature points of a hand on the basis of the depth information of the user's hand image and the depth information of the background image acquired by the 3D sensor;
generating a virtual keyboard matched to each finger when more than a predetermined finger-tip points simultaneously come into contact with the object plane;
determining an input key on the basis of adjacency between a position of the finger-tip point that performs an input process and a key on the virtual keyboard and a context score; and
reading a character matched to the input key from an information table and displaying the character,
wherein the context score is calculated on the basis of the positional information of the finger that performs the input process, positional information that does not perform the input process, and positional information of the feature points, and
in the information table, at least one inputtable key is matched to each finger and different keys are matched to respective fingers to set an input key candidate depending on performing of an input process by the user.

16. The character input method of claim 15, wherein the determining an input key includes calculating positional information of a contact point where the finger-tip point that performs the input process comes into contact with the object plane and positional information of inputtable keys assigned to the finger by using a relative position value with respect to the feature points, and determining the adjacency depending on a position score on the basis of the calculated value.

17. The character input method of claim 16, wherein the position score is calculated as the reciprocal of a distance difference between information of the contact position of the finger-tip point on the object plane and positional information of the inputtable keys for the finger on the virtual keyboard.

18. The character input method of claim 15, further comprising:
determining a position of the virtual keyboard on the basis of the extracted positional information of the finger-tip point and feature points of the hand.

19. The character input method of claim 15, wherein the generating a virtual keyboard includes generating a virtual keyboard in which key arrangement is set on the basis of positions of the respective fingers, and
the virtual keyboard is configured such that keys are arranged on an upper side or a lower side of a reference key line connecting tip points of the respective fingers.

20. The character input method of claim 19, wherein the generating a virtual keyboard includes generating five keys matched to five fingers and the reference key line connecting the five keys, and generating keys arranged on an upper side or lower side separate from the reference key line by an average distance between the five keys with the same interval as the keys arranged on the reference key line and an auxiliary key line having the same curvature as the reference key line, and
generating the reference key lines and the auxiliary key lines for a left hand and a right hand, and generating a virtual keyboard for setting characters respectively matched to the keys.

* * * * *